Patented Dec. 28, 1937

2,103,746

UNITED STATES PATENT OFFICE 2,103,746

LIGHT WEIGHT CONSTRUCTION COMPOSITION

Henry Guth, Cleveland, Ohio, assignor of one-twelfth to Hugo A. Maerlender, Cleveland, Ohio No Drawing. Application November 18, 1935, Serial No. 50,404

5 Claims. (Cl. 106—10)

My invention relates to ceramics, concretes and methods of assembling and forming them. More particularly it relates to compounds like concrete capable of being formed into blocks or other forms used in building as well as the methods of preparing these compounds for various purposes.

One of the major needs of building is a substance which is light and strong and relatively inexpensive to manufacture. It is often required that the material be transported and for this reason it is necessary that the material be as light in weight as possible without any loss in strength. The creation of such a substance is one of the major objects of this invention.

A further and equally important object of my invention includes the creation of a material which in addition to being light may also be nailed, which may be subjected to high temperatures such as may be required for enameling its surfaces and which when cast will retain its shape without warping even in the presence of heat.

A further and incidental object of the invention includes the provision of an aggregate which may be aerated as well as a cheap and convenient method of treatment therefor. Various ingredients of the substances to be made are in themselves separate objects of my invention as will appear more fully hereinafter.

While in the following specifications often only preferred materials are suggested for economical or other reasons, the chemical equivalents thereof or equivalent processes are included within the scope of my invention.

I have found that a material excellently adapted for aeration can be made of ground clay free of decayed matter, a naturally fluffy, yeast-like clay presently to be more particularly described, fire clay, silicate of soda, sulphur and water. The fire clay may be of an inferior grade but the silicate of soda should be heavy and viscous. For high compression aggregates the heaviest grade of silicate of soda obtainable should be used. A suitable proportion for making this material will include 4 parts ground clay preferably 16 mesh, 1 part colloidally powdered yeast-like clay, 1½ parts of a mixture (one part of colloidally powdered fire clay dissolved in two parts of water and aged for a month or more), 1½ parts heavy viscous silicate of soda, $\frac{1}{32}$ part sulphur and ¾ part clean water. For different clays, however, a variation in the amount of clay used may be made. I have used 8 parts clay, 4 parts water, and 2 parts of the other ingredients.

The clay whose yeast-like action I use in combination with the other clays should be naturally powdery and extremely soluble colloidally in water. Its ingredients by way of illustration may be $SiO_2$ in the amount of 64%; $Fe_2O_3$ 6%; $Al_2O_3$ 18%; $SO_3$ a trace; CaO a trace; MgO a trace; Ti a trace; and a trace of $NaO_2$. The foregoing is merely a type since the essential characteristics are physical rather than primarily chemical. Throughout the specifications a yeast-like clay will mean one of the foregoing characteristics. Generally, it will have a relatively high silica and alumina content, while a clay with a relatively high iron oxide content will have greater strength. A talc soapstone or talc stone produces a clay which may be substituted. Any clay having a naturally fine and flocculent structure whether natural or artificially produced by ageing or the addition of chemical elements and treatment thereby may be used. Generally, these clays are high in finely subdivided alumina, silica, shale or mica.

When the above compound has been thoroughly mixed, it is pored into steel or other containers and heated to 650° F. or beyond as desired up to 2100 deg. F. The strength of the material will be increased as the temperature is raised. The time required will vary from a half hour to that desired for further hardening or vitrifying to meet special demands. The heat treatment is preferably performed in an inner firing container cylindrical in shape and revolving in one direction and a larger cylindrical container revolving in the opposite direction. However an ordinary kiln or furnace may be used. The material is then ready for grading and loading.

This material is adaptable as a light weight product or weight reducing material for use with various binders some of which are hereinafter described. A mixture with ordinary clay has many uses. While the proportions of the material in the above formula are those preferably used with a certain type of clay, they can be varied within considerable limits for other types of clay found in different localities.

The fireclay may be any clay which will not show signs of loss of shape by partial fusion when heated to 1580° C. in an oxidizing atmosphere. Generally such clays are composed almost entirely of alumina and silica and where the yeast-like clay is low in alumina a larger quantity of the fireclay will be necessary.

The thickness of slabs made of this material is determined by the size of the slabs. A 16″ x 16″ may be ⅝″ thick. A 24″ x 24″ may be 1″ thick. A 36″ x 72″ may be 1½″ and so on. The slabs may be cast, pressed or vibrated in wooden or steel forms and must be left in the forms until properly cured. Dry winds during the curing should be avoided to prevent splitting or cracking. After removing the forms a coating of a transparent dip such as is described in my copending application Serial No. 50,403 filed November 18, 1935, is applied to fill all pores densely. This is then allowed to dry before applying a glaze or enamel coating. The glazing or enamel should be dried thoroughly before the slabs are conveyed into kilns or fusion ovens. Sulfite heat should be avoided for glazing purposes but for plain slabs any fuel will be satisfactory. The slabs are preferably inserted in a starting heat of 200° F. and gradually within a 48 hour period may be raised to 1800° F. and then within the next 48 hours reduced to 100° or less. Caution must be taken not to shock slabs by sudden changes in temperature. A perfect non-warping line is assured if the slabs are properly made and burned. Lower temperatures down to 1400° F. will suffice for large slabs and slabs for brick, floor or roof tile require no more than 1000° F. the foregoing formula and method may also be used on extrusion equipment to ensure a perfectly non-warping line and product after burning.

To avoid the so called bloom of silicate of soda during aeration in solid inert material or any material to be heat treated as outlined in the foregoing methods it is advisable to subject the material after a cooling period of about 6 hours to immersion in water. The material is then dried gradually to avoid checking in a temperature not above 300° F. Close contact with fire, hot metal or walls as well as cold should be avoided. This treatment will also prevent the soda, alkalis and other salts from exuding and appearing on the surface. The material may then be burned like a brick or enameled in a slow heat to avoid sagging.

In place of sulphur as an acid reducing agent where the clay used is slightly acid I may also use sodium hydrochlorite or raw dissolved limestone. Clays containing iron oxide in appreciable quantities require an acid reducing agent. In this case a slight change in the analysis can be made with an increase in clay in the aeration formula previously described. I have used 4 parts clay with 1 part silicate of soda and 1 part of sodium hydrochlorite. This results in a somewhat cheaper and stronger product. The previously described bloom is also absent and the water treatment is thereby obviated.

In the foregoing compositions and their variations in analyses and methods of treatment I provide a material which is extremely light as may be desired, which may be heat treated for aeration, glazing or enameling or all of these purposes combined and which is extremely cheap to manufacture. It should also be borne in mind that a concrete composition is made available which is as readily nailed as wood. Its further utility resides in the fact that the analyses therefor may be readily adapted to any type of material found in the locality in which the material is made. Glazed and enamel products whether of extreme weight or lightness are thus made available for building or rehabilitation purposes at a fraction of their usual cost.

Having thus described my invention what I claim and desire to secure by Letters Patents is:—

1. A lightweight construction composition comprising an ordinary clay, a yeast-like clay, fireclay, silicate of soda, sulphur and water and heated to from 650 degrees F. to 2100 degrees F.

2. A lightweight construction composition comprising substantially 4 parts ordinary clay, 1 part colloidally powdered yeast-like clay, 1½ parts of an aged mixture of one part colloidally powdered fire clay dispersed in two parts of water, 1½ parts viscous silicate of soda, $\frac{1}{32}$ part sulphur and ¾ part water, and heated to from 650 degrees F. to 2100 degrees F.

3. A lightweight construction aggregate comprising an ordinary clay, a yeast-like clay, fireclay, silicate of soda, an acid reducing agent and water and heated to from 650° F. to 2100° F.

4. A lightweight construction aggregate comprising an ordinary clay, a yeast-like clay, fireclay, silicate of soda and water and heated to from 650° F. to 2100° F.

5. A lightweight construction aggregate comprising substantially 4 parts ordinary clay, 1 part colloidally powdered yeast-like clay, 1½ parts of an aged mixture of one part colloidally powdered fireclay dispersed in two parts of water, 1½ parts viscous silicate of soda and ¾ part water and heated to from 650° F. to 2100° F.

HENRY GUTH.